June 25, 1935.　　　C. BORNMANN ET AL　　　2,005,820

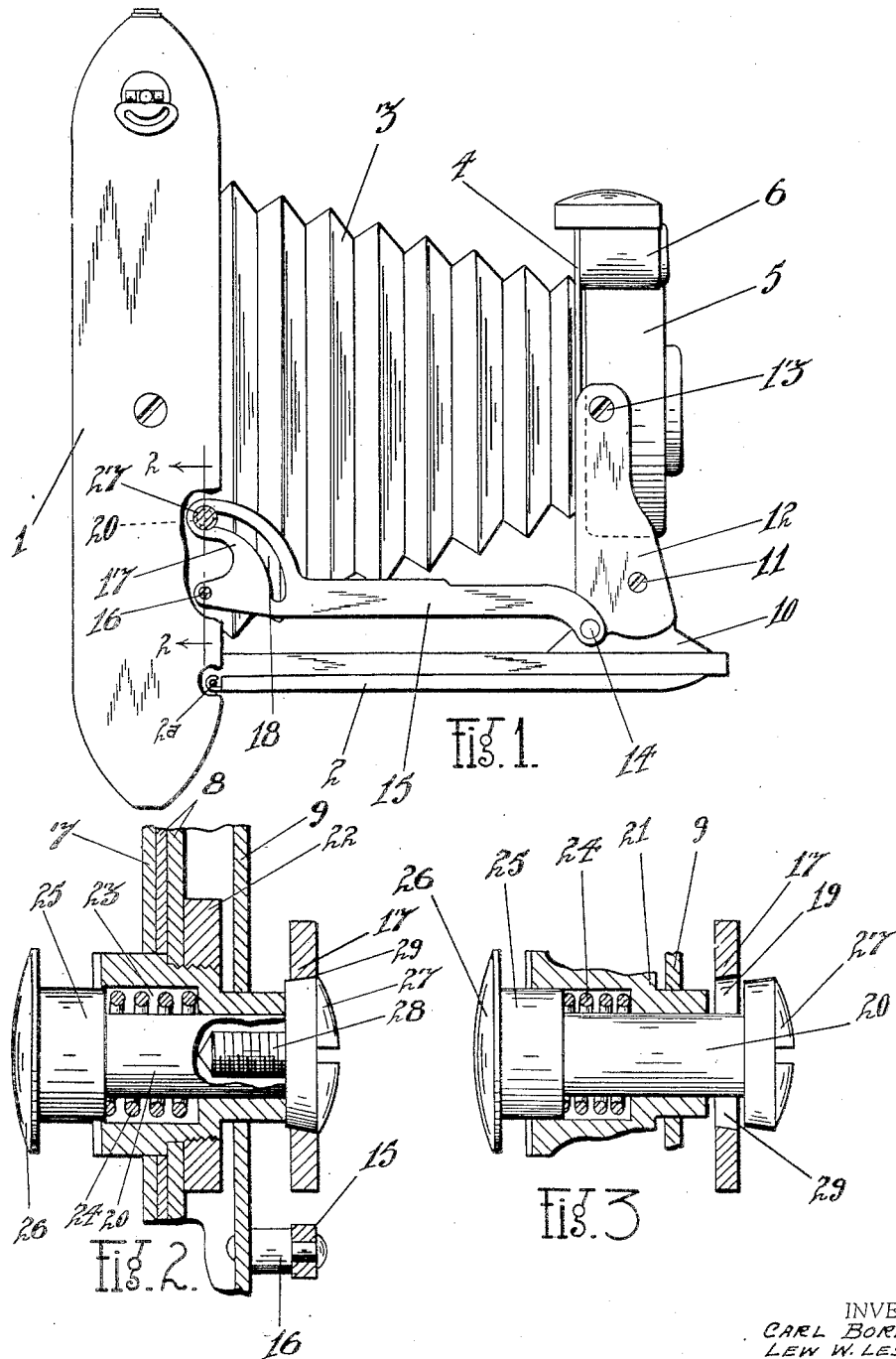

FOLDING CAMERA

Filed Dec. 18, 1934　　　2 Sheets-Sheet 2

INVENTORS
CARL BORNMANN.
LEW W. LESSLER.
ERIC H. HEYER.
BY
　　　ATTORNEY.

Patented June 25, 1935

2,005,820

UNITED STATES PATENT OFFICE 2,005,820

FOLDING CAMERA

Carl Bornmann, Lew W. Lessler, and Eric H. Heyer, Binghamton, N. Y., assignors to Agfa Ansco Corporation, Binghamton, N. Y., a corporation of New York Application December 18, 1934, Serial No. 758,070

10 Claims. (Cl. 95—40)

Our invention relates to folding cameras and has for its primary object the provision of locking and releasing means for the platform or bed of a folding camera.

Our invention relates particularly to the type of folding camera wherein by means of links and levers connected to the body of the camera and to the platform, the front or lens carrier is erected and held in proper picture taking position when the camera is opened and the platform lowered, although it will be clear as the description proceeds that it is equally adapted to the ordinary folding camera having links or braces between the body and the platform.

One important object of our invention lies in the provision of locking and releasing means acting upon certain of the erecting links and thus eliminating the necessity for the usual side braces between the body of the camera and the platform.

One outstanding object of importance lies in the provision of locking and releasing means for the platform located upon the body of the camera and in such position that an operator can readily release the locking means with one hand.

More specifically the invention contemplates the use of a locking member located on each side of the body of the camera, each cooperating with the adjacent link and including release means which can be simultaneously operated by the thumb and a finger of one hand normally holding the camera in a convenient and conventional manner.

Other objects and advantages will be apparent as the description proceeds, reference now being had to the figures of the accompanying drawing forming a part of this application and wherein like reference numerals indicate like parts.

In the drawings:

Figure 1 is a side view of a folding camera, the body being broken away at one point to illustrate our improved locking means for the platform.

Figure 2 is a detail enlarged sectional view taken on the line 2—2 of Figure 1.

Figure 3 is a detail sectional view of part of the mechanism shown in Figure 2 with the locking and releasing device in a different position.

Figures 4, 5:
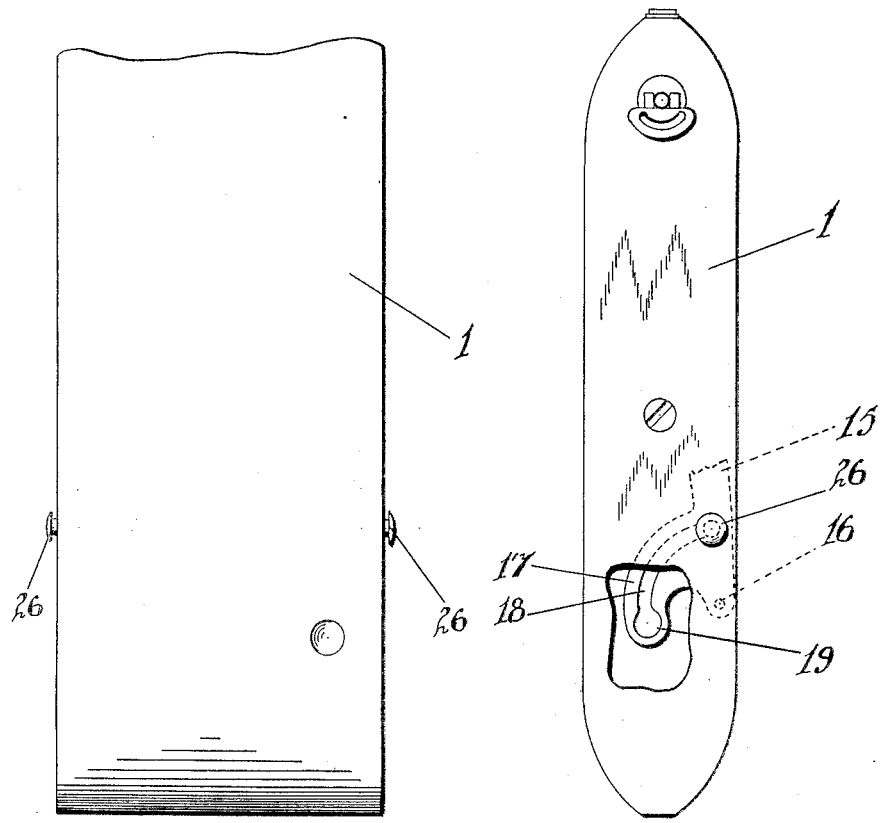
Figure 4 is a rear view of a folding camera equipped with my invention.
Figure 5 is a side view of the camera in closed position and partially broken away to illustrate a portion of the locking means.

The reference character 1 refers generally to the body of the camera. 2 refers to the platform or bed suitably pivoted to the body of the camera at 2a, and 3, the bellows extending from the body to the front or lens carrier 4, upon which is mounted the lens and shutter mechanism 5 with the usual view finder 6.

The body 1 may be of any desired construction and material as this forms no part of this invention. In the form shown the sides of the body 1 are composed of the outer cover plate 7 overlying the adjacent flanges or plate members 8 and 10 the spaced inner plate 9 going to make up this particular body construction.

Adjacent the front or free end of the platform 2 there are provided at each side thereof, rigid upstanding supporting members 10 to which are pivoted, as at 11, the levers 12. These levers pivotally carry as at 13 the lens carrier 14. Pivotally attached as at 14 to the levers 12, at points below the pivots 11 of such levers, are the front ends of links 15 pivotally secured at their opposite ends as at 16 to the body 1 at points spaced substantially above the pivot of the platform 2. It should be understood here that although I have shown but one side of the camera and the bracket 10, lever 12, and link 15 on that side, the same parts are duplicated exactly on the opposite side of the platform.

For further details of the levers 12 and the means provided on cameras of this type for limiting the movement of the lens carrier and of the levers 12, reference may be had to the United States Patent to Goldhammer, No. 1,793,925, dated February 24, 1931.

In order to limit the pivotal movement of the platform 2 when the same is opened, and in order to support the platform in its opened position, in proper cooperation with the levers 12 and the lens carrier, the rear ends of the links 15 are provided with upwardly and rearwardly curving extensions 17 provided with slots 18, the upper and rearward ends of which slots are formed as circular openings 19 (See Figure 5).

Engaging in each of the slots 18 is a pin 20 slidably mounted in a hollow bushing 21 secured in an opening in each side of the body of the camera as by means of a threaded nut 22 engaging a threaded portion of the bushing 21 between the spaced plates 8 and 9 of the camera body. The bushing 21 is recessed as at 23 and within the recess is disposed a coiled spring 24 encircling the pin 20 and engaging at one end against the end of the recess 23 and at its opposite end against a head 25 formed as an enlargement of the pin 20, whereby such pin 20 is normally urged outwardly or to the left in Figure 2. The head 25 is provided with a suitable finger piece 26.

The inner end of the pin 20 is provided with an enlarged head 27 having a threaded stem 28 whereby the head 27 may be secured to the pin in rigid fixed relation thereto. This head 27 engaging against the inner end of the bushing 21 limits the outward movement of the pin 20.

As shown clearly in Figure 2 the head 27 is adapted to engage within the circular opening 19 at the upper inner end of the slot 18, when the platform 2 is moved to its open position shown in Figure 1. This engagement of the head 27 within the opening 19 is automatic as soon as the platform reaches a predetermined lowered position, as the spring 24 urging the pin 20 outwardly causes the head 27 to immediately snap into the opening 19 when such opening reaches an aligning position therewith. This aligning position for the locking engagement between the head 27 and the opening 19 is predetermined with respect to the proper open position of the platform and of the levers 12 and lens carrier 4.

It should be pointed out here that both the opening 19 and the peripheral edge of the head 27 are beveled or tapered as at 29. This serves as a guiding and centering means for the head 27 as it moves into the slot 19 and also serves to prevent accidentally springing the extension 17 of the links 15 inwardly past the heads 27.

Obviously in the position just described and as shown clearly in Figures 1 and 2, the platform is supported in its open position by the links 15 and rigidly locked in such position through such links by means of the heads 27 engaging within the openings 19. This arrangement provides a very substantial and rigid support for the platform in its open position due to the substantial spacing between the pins 20 and the pivot 2a of the platform 2.

When it is desired to unlock the platform 2 and move it to closed position within the body of the camera, namely, to the position shown in Figure 5, it is merely necessary to press inwardly upon the pins 20, utilizing the projecting finger pieces 26 for that purpose, whereupon the heads 27 move out of engagement with the openings 19, whereupon the platform 2 may be rocked upwardly on its pivot, the pins 20 sliding within the arcuate slots 18 of the extensions 17 on the links 15.

The platform 2 may thus be moved completely to its closed position with respect to the body 1 where it may be locked by any of the conventional latches usually provided for that purpose and from which position it may be released in the conventional manner when it is desired to again open the camera for use. It is immaterial whether spring means are provided for normally throwing the platform 2 to its complete open position when released from its closed position or whether it must be pulled down to its full open position. In either event when the platform 2 reaches the predetermined opened position, the head 27 on the pin 20, under the influence of the coil spring 24, will move into its corresponding opening 19 to lock the link 15 and thus the platform 2 in such open position.

It will be clear from Figure 4 that the pins 20 with their finger pieces 26 project slightly outwardly from the opposite sides of the body 1 in a convenient position for simultaneously pressing them inwardly with the thumb and a finger of one hand in order to release the platform for closing. This provides a very much more convenient and simple releasing means for the platform than the conventional and well known side braces usually provided extending from the body of the camera to the platform on each side and which require the use of both hands with a thumb pressing on each brace to release the platform lock. With applicant's invention, the operator may grasp the camera in one hand in a conventional and normal manner and with the thumb and one finger simultaneously press the finger pieces 26 to release the locking means for the platform whereupon the platform may be pivoted upwardly to closed position, the links 15, the levers 12 and the lens carrier 4 simultaneously moving to and assuming their normal folded positions within the body 1.

Of course, changes may be made in details of construction and arrangement of parts without departing from the spirit and scope of our invention. We do not limit ourselves, therefore, to the exact form herein shown and described other than by the appended claims.

We claim:

1. A folding camera comprising a body, a platform hinged thereto, a lens carrier pivotally supported on said platform, means pivoted to said body for supporting said platform in its opened position, said means having connection with said carrier to rock the same on its pivot when said platform is opened and closed, means on said body for locking and releasing said supporting means, and means on said body for actuating said locking and releasing means.

2. A folding camera comprising a body, a platform hinged thereto, a lens carrier pivotally supported on said platform, means pivoted to said body for supporting said platform in its opened position, said means having connection with said carrier to rock the same on its pivot when said platform is opened and closed, means wholly on said body for locking and releasing said supporting means in its supporting position, and means wholly on said body for actuating said locking and releasing means.

3. In combination, a camera body, a platform hinged thereto for movement to closed and open positions with respect to said body, means pivoted to said body for supporting said platform in its effective open position, means for locking and releasing said supporting means at a point remote from the pivot thereof, and means slidable through the side of said body at such point for actuating said locking and releasing means.

4. In combination, a camera body, a platform hinged thereto for movement to closed and open position with respect to said body, link means pivoted to said body for supporting said platform in open position, means slidable through the side of said body and engageable with said link means at a point remote from the pivot thereof for locking said link means in a predetermined position of said platform, and means on said slidable means and projecting through the side of said body for releasing said locking means.

5. In combination, a camera body, a platform hinged thereto for movement to closed and open position with respect to said body, front erecting means pivoted on said platform, means pivoted to said body and to said erecting means for supporting said platform in open position and for actuating said front erecting means, means for locking said supporting means in a predetermined position of said platform, and means on said body for releasing said locking means.

6. In combination, a camera body, a platform hinged thereto for movement to closed and open position with respect to said body, front erecting means pivoted on said platform, means pivoted to said body and to said erecting means for supporting said platform in open position and for actuating said front erecting means, means on said body for locking said supporting means in a predetermined open position of said platform, and means wholly on said body for releasing said locking means.

7. In combination, a camera body, a platform hinged thereto for movement to closed and open positions with respect to said body, means connected to said body for supporting and locking said platform in a predetermined opened position, and actuating means on said body for releasing said locking means, said actuating means comprising slidable members extending through the sides of said body provided with projecting finger pieces on their outer ends and cooperatively engaging said supporting means at their inner ends, said supporting means comprising links provided with slots for receiving said slidable members.

8. In combination, a camera body, a platform hinged thereto for movement to closed and open positions with respect to said body, means connected to said body for supporting and locking said platform in a predetermined opened position, and actuating means on said body for releasing said locking means, said actuating means comprising slidable members extending through the sides of said body provided with projecting finger pieces on their outer ends and cooperatively engaging said supporting means at their inner ends, said supporting means comprising links provided with slots for receiving said slidable members, the inner ends of said members having enlarged heads thereon and the ends of said slots having enlarged openings to receive said heads in one position of said supporting links.

9. In combination, a camera body, a platform hinged thereto for movement to closed and open positions with respect to said body, means connected to said body for supporting and locking said platform in a predetermined opened position, and actuating means on said body for releasing said locking means, said actuating means comprising slidable members extending through the sides of said body provided with projecting finger pieces on their outer ends and cooperatively engaging said supporting means at their inner ends, said supporting means comprising links provided with slots for receiving said slidable members, the inner ends of said members having enlarged heads thereon and the ends of said slots having enlarged openings to receive said heads in one position of said supporting links, said heads and said slots being tapered.

10. In combination, a camera body, a platform hinged thereto for movement to closed and open positions with respect to said body, means connected to said body for supporting and locking said platform in a predetermined opened position and actuating means on said body for releasing said locking means, said actuating means comprising slidable members extending through the sides of said body provided with projecting finger pieces on their outer ends and cooperatively engaging said supporting means at their inner ends, said supporting means comprising links provided with slots for receiving said slidable members, the inner ends of said members having enlarged heads thereon and the ends of said slots having enlarged openings to receive said heads in one position of said supporting links, said heads and said slots being tapered, and spring means normally urging said heads into said openings when the same are in alignment.

CARL BORNMANN.
LEW W. LESSLER.
ERIC H. HEYER.